Feb. 17, 1931.                P. F. VICTOR                1,793,266
              CONTROLLER FOR AUTOMOBILE HEATERS AND THE LIKE
                          Filed March 8, 1928

Inventor.
Paul F. Victor.
By H. Miller Belfield, Atty.

Patented Feb. 17, 1931

1,793,266

UNITED STATES PATENT OFFICE

PAUL F. VICTOR, OF RIVER FOREST, ILLINOIS

CONTROLLER FOR AUTOMOBILE HEATERS AND THE LIKE

Application filed March 8, 1928. Serial No. 260,152.

My invention relates to controllers for automobile heaters and the like.

One of the objects of the invention is to provide a simple, practical and advantageous device of the class specified.

Another object of the invention is to arrange for the advantageous and simple control of the amount of heat emitted by the heater and to permit the ready variation of this heat, as desired.

Another object of the invention is to arrange for the ready and convenient mounting of the controlling mechanism so that it may be not only accessible, but also readily and easily operable by a person in an automobile.

Another object of the invention is to arrange to accommodate the device to different positions or locations in the automobile.

Figure 1:
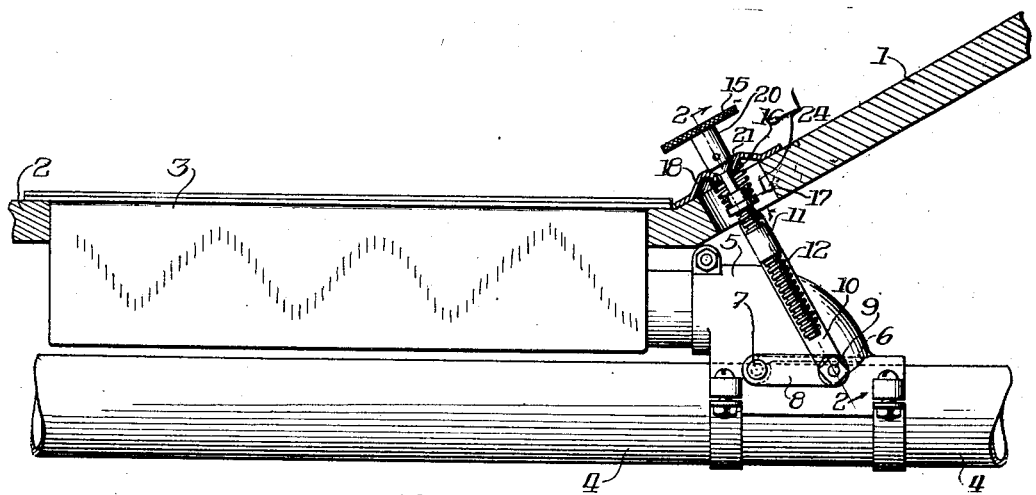
Fig. 1 is a view partly in side elevation and partly in vertical section of a portion of an automobile provided with a heater and controlling mechanism therefor embodying my invention.

Referring to the drawings, I show an inclined member 1 which is understood to be the footboard of an automobile. In the rear of this and set in the floor 2 of an automobile is a heater 3, the construction of which is not shown, as said heater forms no part of the present invention. A pipe 4 is understood to be an exhaust pipe from the automobile motor or other suitable pipe for conveying heated gases to the heater 3. For such purposes a branch or side pipe 5 is shown, leading from pipe 4 to heater 3.

For controlling the amount of heated gas which may pass from pipe 4 into heater 3, suitable arrangement may be made, as for example, a valve 6 which may be pivoted at 7 so that it may swing up and down and more or less open the port or aperture at the junction of pipes 4 and 5.

Figure 2:
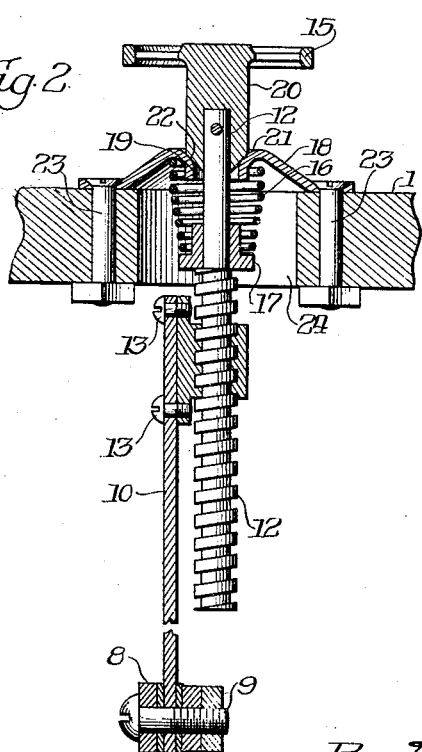
Fig. 2 is a cross section taken on line 2—2 in Fig. 1 on an enlarged scale.
Figure 3:
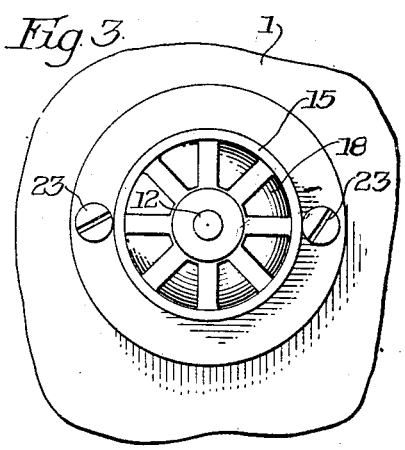
Fig. 3 is a plan view on a still further enlarged scale of the operating portion of the device.

For controlling the valve 6, I show an arm 8 connected to the outer end of pivot 7 and in turn having a pivotal connection at 9 with a link or rod 10, which latter is provided with a collar or sleeve 11 which is internally screw-threaded with threads adapted to cooperate with the threads of a screw member 12. The collar 11 may be secured to link or rod 10 by screws 13 (Fig. 2), or by welding or otherwise.

The screw member 12 is provided at its upper end with a hand wheel 15 by which it may be readily turned by hand and when it is thus turned screw 12 will move or work up and down in collar 11 and thereby raise and lower the rod or link 10 and cause an adjustment of valve 6 to admit more or less heating gas or fluid into pipe 5 and heater 3.

For advantageous attachment to the floor or front member 1 of the automobile, I show an arrangement in the form of a ball and socket, or universal joint device, which may consist of a coil spring 16 surrounding the upper end of screw member 12, a stop or collar 17 for the lower end of said spring 16, and a plate 18 serving as a stop for the upper end of spring 16. Plate 18 preferably has an aperture 19 sufficiently large to accommodate screw member 12 but not large enough to accommodate the hub portion 20 of hand wheel 15, the side walls 21 of plate 18 being preferably rounded and the lower end 22 of hub portion 20 being preferably cone-shaped, so that plate 18 may be angularly adjusted with reference to screw member 12 and hub 20. Plate 18 may be secured to the floor portion 1 in any suitable manner, as for example, by screws 23, said member 1 being provided with an aperture or opening 24 of sufficient size to receive and readily accommodate spring 16 and associated parts.

By such arrangement the controlling device or mechanism may be applied by attaching plate 18, as indicated, and connecting link 10 with the valve arm or member and turning hand wheel 15 so as to adjust the controlling valve in any desired manner. This application of the controlling mechanism is very convenient and accessible, being on the floor or other part of the automobile in any convenient place where it may be readily reached and turned by the hand, or even by the foot, if desired. Accuracy of adjustment is readily obtainable because of the screw threaded arrangement and positive operation of the controlling valve in either direction is secured and when adjustment is made the parts will remain in adjustment until again readjusted by the operator.

The connection between the device and the floor or other wall or partition of the automobile accommodates various inclinations of the operating parts, so that the device may be applied to various different types or makes of cars and also to the same car in different positions or angularities, and also so that a change in angularity after or during installation will not interfere at all with the effective operation of the mechanism.

It will be understood that changes and modifications may be made without departing from the spirit of the invention.

What I claim is:

1. A valve device comprising a body having a port therein, a valve for the port, a threaded member mounted for rotation to actuate the valve, a plate for journalling said threaded member, a stop-collar on said threaded member below the said plate and a coil spring reacting between the said plate and the said stop-collar for frictionally resisting rotation of the said threaded member.

2. A valve device comprising a body having a port therein, a valve for the port, a threaded member mounted for rotation to actuate the valve, a plate for journalling said threaded member, a stop-collar on said threaded member below the said plate and a coil spring reacting between the said plate and the said stop-collar, a hand-wheel on the threaded member above the said plate, a frusto-conoidal hub on the hand-wheel, a cooperating opening in the plate for receiving the conoidal portion of the hub whereby angular relation with respect to the threaded member and the plate may vary without interfering with the proper operation of the related parts.

3. In an automobile heating device deriving its heating medium by bypassing the motor-exhaust gases thereinto, a bypass valve, means for controlling the amount of gases passing through said bypass valve, said means including a screw-threaded rod, a coil spring around said rod for frictionally resisting its rotation, a link and a screw-threaded collar attached to the link, said collar associated with the screw-threaded rod whereby rotative motion of the said rod is translated to reciprocating motion of the said collar for rocking the said link, thereby operating the valve.

4. In a device of the class described having a support for the parts with an aperture therethrough, a valve below the support, a cover plate secured to the upper side of the said support, an opening in the said cover plate concentric with the said aperture in the support, a screw-threaded member having a reduced portion, said reduced portion arranged to pass through the opening in the said plate, a stop-collar on the said reduced portion, a spring reacting between the stop-collar and the bottom of the plate, and a handwheel above the plate secured to the threaded member for operating same, and thereby the valve, a hub on the said handwheel arranged to contact the said cover plate and resist reaction of the said spring.

5. In a device of the class described, having an apertured support for the parts, a valve below the support, a cover plate secured to the upper side of the said support, an opening in the said cover plate concentric with the said aperture in the support, a screw-threaded member having a reduced portion, said reduced portion arranged to pass through the opening in the said plate, a stop-collar on the said reduced portion, a compression spring reacting between the stop-collar and the bottom of the plate, a handwheel above the plate secured to the threaded member for operating same and thereby the valve, a hub on the said handwheel arranged to contact the said cover plate, said compression spring arranged to cause friction between the said cover plate and the hub of the handwheel.

In witness whereof, I hereunto subscribe my name this 20th day of February, A. D. 1928.

PAUL F. VICTOR.